Patented Aug. 19, 1930

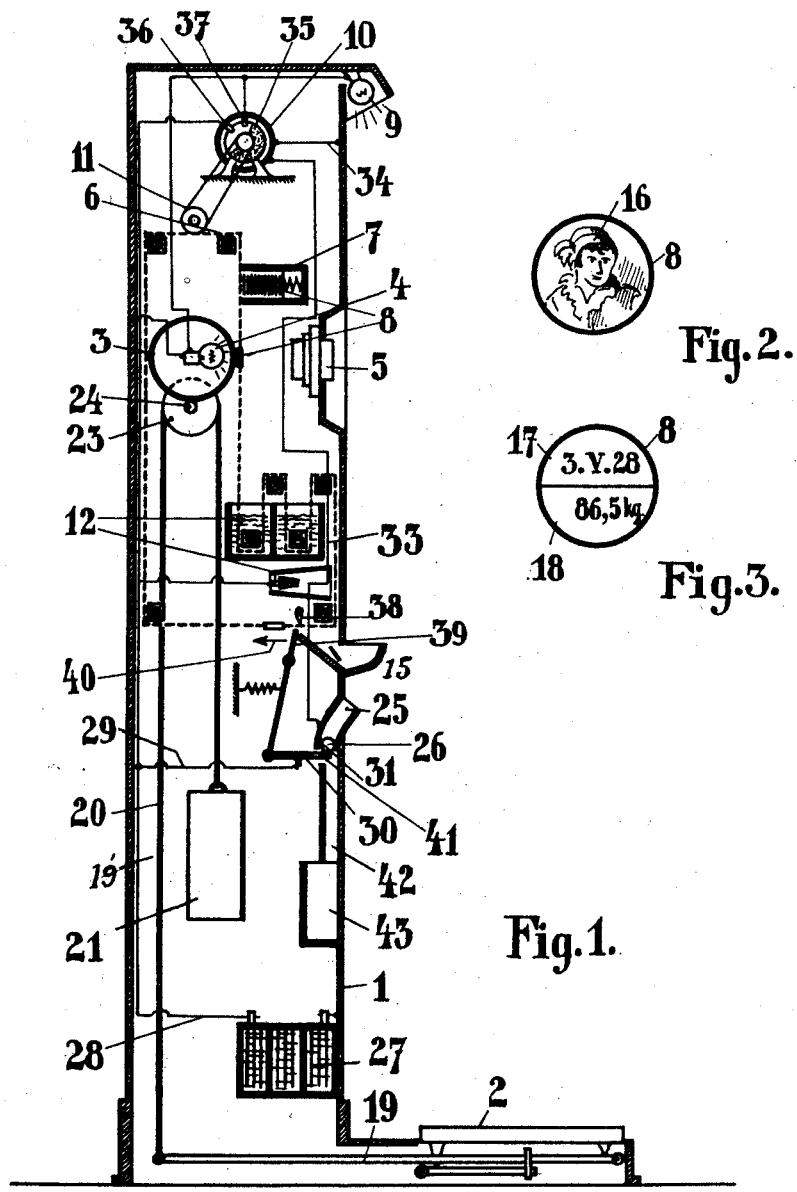

1,773,239

UNITED STATES PATENT OFFICE

MAX JOSEF POHL, OF FRANKFORT-ON-THE-MAIN, GERMANY, ASSIGNOR TO AUTO-MATEN- & FUELLUNGS-MANUFAKTUR, G. M. B. H., OF FRANKFORT-ON-THE-MAIN, GERMANY

AUTOMATIC WEIGHING MACHINE

Application filed August 20, 1928, Serial No. 300,871, and in Germany May 16, 1928.

This invention has for its object to avoid an inconvenience connected with the commonly used weighing machines, as a certain document is supplied at the weighing which proves that the weight-indications relate to the person who has used the weighing machine.

It has already been proposed to automatically supply tickets, on which the date and the weight are printed. Such tickets are however not a document in the meaning of the word as nothing indicates that the numerals relate to a certain person.

To obtain a reliable document it would not be sufficient to write or print on such a weighing ticket the name of the person who has been weighed.

According to the invention an automatically operated camera is combined with the automatic weighing machine so that it is positively coupled with the weighing mechanism. On the printed ticket, issued by the weighing machine, not only the date and the weight but also a photograph of the weighed person or object are photographed. In this manner it is possible to obtain by the combination of an automatic weighing machine with a camera an absolute reliable document, this being important for many purposes.

The positive connection of the automatic weighing machine and an automatic camera is carried out so that only a characteristic portion of the object or person who has been weighed is photographed, for instance of boxes or parcels the mark and of persons only the figure.

An arrangement of the latter kind is illustrated, by way of example, in the accompanying drawing, in which Fig. 1 shows in side elevation, the upper portion in vertical section, a weighing machine combined with a camera, the weighing mechanism being omitted.

Fig. 2 shows the front side of the weighing ticket issued and

Fig. 3 shows the rear side of the ticket.

The casing 1 of the automatic weighing machine comprises a platform 2 on which the person to be weighed is standing. The weighing mechanism is operated as follows:

By the platform 2, when the same is being depressed by a person, a lever 19 is depressed at one end, whereby a steel band 19' is slackened and stretched again by a counterweight 21 attached to the other end of the steel band, so that a pulley 23, over which the steel band passes, is rotated, the axle 24 of said pulley rotating a cylinder 3 in which an incandescent electric lamp is mounted. On the transparent cylinder 3 numerals are painted in mirror reflected picture.

As soon as by the insertion of a coin into a coin slot 25, or by depressing of a switch, a circuit has been closed, current flows from a battery 27 through wires 28 and 29 to a slide 30, thence through the inserted coin 26 to a contact 31 and through a wire 33 to a motor 10, thence through a wire 34 to the mass of the casing, to which also the negative pole of the battery 27 is connected. By this circuit closing the motor 10 is started so that it operates, through the intermediary of a wheel 11, a conveying chain 6 for the light-sensitive paper sheets 8 onto which the indication of the weighing machine and also those of the photographing apparatus, which will be hereinafter described, have to be transmitted. On the shaft of the motor a switch disc 35 is keyed which, after a certain part rotation, causes through two contacts 36 and 37 lighting of lamps 4 and 9. The switch disc 35 must, prior to touching the contacts 35 and 34, carry out a part rotation, the amplitude of which is sufficient to allow a sheet 8 of light-sensitive paper to be removed from a magazine 7 and to be conveyed to in front of the cylinder 3. At the lighting up of the two lamps 4 and 9 the weighing number is photographed upon the one side of the paper sheet 8 and the picture of the person is photochemically produced through the lens 5, directed to the space above the platform 2, on the other side of the paper sheet 8. The motor 10 is so constructed as to be momentarily arrested when the sheet 8 is between the lamp and lens for the taking of the picture and continuing to run, the exposed paper sheet 8 is conducted through the developing and drying vessels 12 and thence to a stripper 38 where it is stripped off and drops into a delivering chute 15. A lever 39 is at the same time oscillated in the direction of the arrow line 40 so that the slide 30 is pulled back and its slot 41 brought into register with the coin 26 so that this coin drops through a chute 42 into a collector 43. By the dropping of the coin 26 the circuit of the motor 10 is interrupted so that this motor stops.

Instead of a person a box might be weighed, the number or signature on which being then photographed on disc 8.

It is evidently not necessary to photograph the weight numeral 16 and the date 17 on the disc 8, as they might be printed on or stamped into the corresponding side of the disc 8 in which case the photograph of the person or object would be above these indications. By photographing these numerals on the disc the mechanism is however considerably simplified.

For the sheet metal disc a ticket of cardboard or other material made light sensitive may be used, the tickets being cut off a strip during the weighing operation.

An inconvenience connected with the printing of the weight number in the usual manner by means of type disc to be operated and stopped by complicated transmission gears is, that numerous friction resistances have to be overcome wherefrom result inaccuracies requiring subsequent adjusting of the weighing machines, requiring much time, so that gauging of the machines is practically impossible. All these frictions and inaccuracies are suppressed when the numerals indicating the weight and the date are photographed on the tickets, so that the automatic machine can be gauged whereby the importance of the weighing ticket as a document is further increased.

The frequently ascertained variations of weight are only apparent as a woman will weigh herself now without a cloak and then with a cloak. The combination of the weighing ticket with the photograph of the person who has been weighed makes in consequently possible to ascertain the weight in a much more reliable manner.

I claim:—

1. The combination of an automatic weighing machine in which by the weighing operation the weight is marked on a ticket, an automatic photographing machine, the lens of which is directed only to the space above the weighing platform and which produces a photograph of the weighed person or article or of a portion of the same, a conveying device for the ticket to be printed conveying the ticket through the weighing machine and through the photographing machine so that one and the same ticket records documentary evidence of the results of the weighing operation and a photograph of the weighed person or article.

2. In a photographing and weight recording machine, a weight register, a photographic lens and means for moving a sensitized ticket into exposure position relative to the weight register and lens, momentarily arresting movement thereof for photographing a person on one side of the ticket and photographing the weighing indicia on the other side, developing and printing baths through which the exposed ticket passes and delivery means for the printed ticket.

3. In a photographing and weight recording machine, a weight register, a photographic lens and means for moving a sensitized ticket into exposure position relative to the weight register and lens, momentarily arresting movement thereof for photographing a person on one side of the ticket and photographing the weighing indicia on the other side, developing and printing baths through which the exposed ticket passes and delivery means for the printed ticket, and means effecting illumination of a person or object being photographed.

4. In a photographing and weight recording machine, a weight register, a photographic lens, a conveyor for moving a sensitized ticket into exposure position relative to the weight register and lens, electrical means for operating the conveyor rendered operable upon insertion of a coin in the machine, said electrical means being rendered momentarily inoperative for photographing a person or object on one side and photographing weighing indicia on the other side, developing and printing baths through which the exposed ticket passes and means for delivering the printed ticket and discharging the coin into a receptacle and rendering the electrical means inoperative.

In testimony whereof I affix my signature.

MAX JOSEF POHL.